UNITED STATES PATENT OFFICE.

WILLIAM HORLICK, OF RACINE, WISCONSIN.

METHOD OF PREPARING EDIBLE TABLETS.

SPECIFICATION forming part of Letters Patent No. 585,758, dated July 6, 1897.

Application filed September 3, 1895. Serial No. 561,323. (Specimens.)

*To all whom it may concern:*

Be it known that I, WILLIAM HORLICK, a citizen of the United States, and a resident of Racine, in the county of Racine and State of Wisconsin, have invented certain new and useful Improvements in the Method of Producing Edible and Soluble Tablets; and I do hereby declare that the following is a full, clear, and exact description thereof.

My invention relates to the preparation of dry soluble milk tablets in a compressed solid form; and it consists in certain peculiarities in the composition of the same, as well as in the method of producing these dry milk tablets, all as will be fully set forth hereinafter, and subsequently claimed.

The object of my invention is the production in a compact solid form of an article the essential ingredient of which is milk in a dry state, so that the same may be utilized at any time, without further preparation, as a food, or, if preferred, be dissolved in water to form a beverage.

In preparing my tablets I proceed in the first place in somewhat similar manner to that described in my prior patent, No. 278,967, granted to me on the 5th day of June, 1883, except that instead of taking finely-ground malt and cereals and macerating the same in fresh milk I prefer to take malt and merely crush or break the same into a coarse product, adding thereto wheat-flour or rye-flour and macerate the same in cold water. I take about equal quantities of this coarsely-broken barley-malt and wheat or other flour and mix them thoroughly together in pure fresh cold water, using only enough water to form a soft or loose mash. Then I raise the temperature to about 160° or 165° Fahrenheit, keeping the mash in agitation meanwhile for a sufficient length of time until it becomes thin enough to filter. I next filter the same and add to a given quantity of this filtered extract a substantially equal quantity of pure fresh cows' milk and mix the two together thoroughly, so that the milk may become fully incorporated, and next pasteurize the resulting product by holding it at a temperature of, say, about 170° to 180° Fahrenheit for some thirty minutes, which effectually destroys any possible germ-life in the mixture. I next evaporate the pasteurized product *in vacuo* to the consistency of a thick syrup or molasses, and next, if desired, give it any preferred flavoring by adding, say, from five to fifteen per centum (increasing or decreasing the amount in any given case to suit the taste) of either cocoa, chocolate, beef-extract, or any other desired flavoring and thoroughly mix the whole mass by stirring *in vacuo* until it is evaporated to a practically dry form, and then this product is removed and subjected to heavy pressure in molds, forming the described tablets. If preferred, this described flavoring may be omitted, with the process and product otherwise exactly the same.

It will be observed that in this invention I also differ from that set forth in my previously-named prior patent in not granulating the resulting mass, but instead thereof press the product into convenient molded forms. My present article is not specifically intended, as was the other, as a food for infants and invalids, but is designed as a convenient practical form of affording a valuable concentrated easily-assimilated nutrient for the general traveling public or those desiring a quick lunch at their desks or in their rooms without the necessity of cooking or preparing the same, while if a substitute for cocoa, coffee, beef-tea, or other warm beverage is desired my tablets can be easily and readily dissolved in hot water.

These tablets will be found invaluable to pedestrians and bicyclists, for example, on account of the small space they occupy, as two or three carried in the pocket will instantly afford the necessary nutriment, for which reason they are also useful for soldiers on forced marches and for explorers in inhospitable regions and for hunters and fishermen, as well as particularly acceptable to readers and lecturers and others whose time engagements often interfere with their taking regular meals at set hours.

The tablets can be packed in small flasks, boxes, or other packages and will continue fresh and serviceable for an indefinite time without deterioration.

Having thus described my invention, what I claim as new, and desire to secure by Letters Patent, is—

1. The herein-described method of preparing a compressed edible and soluble tablet, consisting in taking about equal quantities of coarsely broken or crushed barley-malt, and wheat or other flour, and macerating the same in pure fresh cold water; raising the temperature to about 160° to 165° Fahrenheit, and keeping the mash in agitation meanwhile until it becomes thin enough to filter; then filtering the same, and adding to a given quantity of the filtered extract a substantially equal quantity of pure fresh cows' milk, and mixing the two thoroughly; then pasteurizing the resulting product by holding it at a temperature of about 170° to 180° Fahrenheit for some thirty minutes; next evaporating this pasteurized product *in vacuo*, with agitation, until it is practically dry, and then removing the mass and subjecting it to heavy pressure in molds forming the desired tablets, substantially as set forth.

2. The herein-described method of preparing a compressed edible and soluble tablet, consisting in taking about equal quantities of coarsely broken or crushed barley-malt, and wheat or other flour, and macerating the same in pure fresh cold water; raising the temperature to about 160° to 165° Fahrenheit, and keeping the mash in agitation meanwhile until it becomes thin enough to filter; then filtering the same, and adding to a given quantity of the filtered extract a substantially equal quantity of pure fresh cows' milk, and mixing the two thoroughly; then pasteurizing the resulting product by holding it at a temperature of about 170° to 180° Fahrenheit for some thirty minutes; next evaporating this pasteurized product *in vacuo* to the consistency of a thick syrup or molasses; then adding from five to fifteen per centum of any desired flavoring, and thoroughly mixing the whole mass by stirring *in vacuo*, until it is evaporated to a practically dry form, and then removing the mass and subjecting it to heavy pressure in molds forming the described tablets, substantially as set forth.

In testimony that I claim the foregoing I have hereunto set my hand, at Milwaukee, in the county of Milwaukee and State of Wisconsin, in the presence of two witnesses.

WILLIAM HORLICK.

Witnesses:
H. G. UNDERWOOD,
H. J. FORMANN.